United States Patent
Hunzinger et al.

(10) Patent No.: US 12,544,861 B2
(45) Date of Patent: Feb. 10, 2026

(54) METHOD FOR PROCESSING BRITTLE-HARD MATERIALS

(71) Applicant: SCHOTT AG, Mainz (DE)

(72) Inventors: Bernhard Hunzinger, Wackenheim (DE); Ali Al-Zuhairi, Rüsselsheim (DE); Andreas Ortner, Gau-Algesheim (DE); Andreas Koglbauer, Trebur (DE); Imke Adrian, Rüsselsheim (DE)

(73) Assignee: SCHOTT AG, Mainz (DE)

( * ) Notice: Subject to any disclaimer, the term of this patent is extended or adjusted under 35 U.S.C. 154(b) by 803 days.

(21) Appl. No.: 17/141,149

(22) Filed: Jan. 4, 2021

(65) Prior Publication Data
US 2021/0205931 A1 Jul. 8, 2021

(30) Foreign Application Priority Data
Jan. 3, 2020 (DE) ...................... 10 2020 100 051.0

(51) Int. Cl.
*B23K 26/53* (2014.01)
*B23K 26/40* (2014.01)
*B23K 103/00* (2006.01)

(52) U.S. Cl.
CPC .............. *B23K 26/40* (2013.01); *B23K 26/53* (2015.10); *B23K 2103/54* (2018.08)

(58) Field of Classification Search
CPC .... B23K 26/40; B23K 26/53; B23K 2103/54; B23K 26/0624; B23K 26/073;
(Continued)

(56) References Cited

U.S. PATENT DOCUMENTS

| 4,682,003 A | * | 7/1987 | Minakawa | ......... | B23K 26/3576 |
| | | | | | 219/121.72 |
| 8,153,930 B1 | * | 4/2012 | Hawryluk | ......... | H01L 21/67115 |
| | | | | | 219/385 |

(Continued)

FOREIGN PATENT DOCUMENTS

| CN | 102992601 A | * | 3/2013 |
| DE | 19856346 | | 6/2000 |

(Continued)

OTHER PUBLICATIONS

Chip Definition & Meaning—Merriam-Webster, https://www.merriam-webster.com/dictionary/chip (Year: 2009).*

(Continued)

*Primary Examiner* — Tiffany T Tran
(74) *Attorney, Agent, or Firm* — Ruggiero McAllister & McMahon LLC (57) ABSTRACT

A method for the separative processing of brittle-hard materials is provided. The method includes irradiating a surface of a workpiece made of brittle-hard material with a laser beam having a wavelength sufficient so that light of the laser beam is absorbed at the surface and so that the workpiece is heated to create a first temperature gradient in a direction from the surface to an interior of the workpiece; guiding the laser beam over the surface along an irradiated region; forming a second temperature gradient along the surface between the irradiated region and a non-irradiated region adjacent the irradiated region, the first and second temperature gradients interacting in such a way that, on account of thermomechanical stresses, the workpiece is separated below the surface with a portion of the workpiece being severed in the form of a chip.

22 Claims, 6 Drawing Sheets

(58) Field of Classification Search
CPC .............. B23K 26/082; B23K 2103/52; B23K 26/402; B23K 26/38; B23K 26/14; B23K 26/70; B23K 26/702; C03B 33/06; C03B 33/095; C03B 33/091; C03C 23/0025

See application file for complete search history.

(56) References Cited

U.S. PATENT DOCUMENTS

| | | | |
|---|---|---|---|
| 10,315,403 B2* | 6/2019 | Shimoi | .................. B32B 37/06 |
| 2010/0147813 A1 | 6/2010 | Lei | |
| 2012/0047956 A1* | 3/2012 | Li | .......................... C03B 33/091 65/112 |
| 2013/0032582 A1* | 2/2013 | Henley | ................ B23K 26/361 219/121.72 |
| 2014/0239552 A1* | 8/2014 | Srinivas | ................ B23K 26/354 264/400 |
| 2014/0352358 A1* | 12/2014 | Washko, Jr. | ......... B23K 26/128 65/157 |
| 2015/0140241 A1 | 5/2015 | Hosseini | |
| 2015/0165548 A1 | 6/2015 | Marjanovic | |
| 2016/0282527 A1 | 9/2016 | Saito | |
| 2018/0014115 A1 | 1/2018 | Crosby | |
| 2018/0022631 A1 | 1/2018 | Förtsch | |
| 2018/0044219 A1* | 2/2018 | Marjanovic | .......... B23K 26/362 |
| 2018/0057390 A1* | 3/2018 | Hackert | ............. C03B 33/0215 |
| 2018/0093914 A1* | 4/2018 | Akarapu | ............ B23K 26/0608 |
| 2018/0141154 A1 | 5/2018 | Oogushi | |
| 2018/0297887 A1 | 10/2018 | Spier | |
| 2019/0184494 A1* | 6/2019 | Bennett | ................ B23K 26/703 |
| 2019/0300417 A1* | 10/2019 | Stute | .................... B23K 26/364 |
| 2021/0001430 A1* | 1/2021 | Ungaro | ............. B23K 26/0006 |
| 2022/0005740 A1* | 1/2022 | Paeng | ................. H01L 21/3065 |
| 2022/0227654 A1* | 7/2022 | Azuma | ................. C03B 33/082 |

FOREIGN PATENT DOCUMENTS

| | | | | |
|---|---|---|---|---|
| DE | 10200144 | | 7/2003 | |
| DE | 102013204222 | | 9/2014 | |
| DE | 102013204222 A1 | * | 9/2014 | ......... B23K 26/0084 |
| DE | 112014006072 | | 9/2016 | |
| DE | 102015120950 | | 6/2017 | |
| EP | 0936022 | | 8/1999 | |
| WO | 2013126927 | | 8/2013 | |
| WO | 2018213294 | | 11/2018 | |

OTHER PUBLICATIONS

Jebsen-Marwedel, ""Pathologische" Ausnahmezustande des Werkstoffes Glas und ihre Behebung; Eine Brücke zwischen Wissenschaft, Technologie und Praxis", with English translation.

* cited by examiner

METHOD FOR PROCESSING BRITTLE-HARD MATERIALS

CROSS REFERENCE TO RELATED APPLICATIONS

This application claims benefit under 35 USC § 119 of German Application 10 2020 100 051.0 filed Jan. 3, 2020, the entire contents of which are incorporated herein by reference.

BACKGROUND

1. Field of the Invention

In general, the invention relates to the processing of products made of brittle-hard materials, such as glass or glass ceramic. In particular, the invention relates to the separative processing of brittle-hard materials by the removal of material.

2. Description of Related Art

US 2018/0141154 A1 describes a method and an apparatus for chamfering workpiece edges. In this case, an ultrashort pulse laser is used to direct a laser beam obliquely onto the edge of the workpiece that is to be processed, in order to create laser filaments lying diagonally in the edge. The laser is beamed into the workpiece through a transparent element with an oblique surface in order to increase the incident angle at the workpiece.

A further method for chamfering glass elements by laser processing is known from US 2010/0147813 A1. The method is based on using the laser by way of ablation to create oblique gutters that extend diagonally in the glass. However, ablation is a very slow process if greater cutting depths are to be introduced.

A further separative processing method is also, in general, the etching of glass. However, this necessitates the use of aggressive etching media, is likewise slow, and, moreover, does not take place in a spatially resolved manner without further measures, such as by masking.

SUMMARY

The invention is therefore based on the object of simplifying and speeding up the separative processing of brittle-hard materials, such as, in particular, glass or glass ceramics, with high precision.

In accordance therewith, the invention provides a method for the separative processing of brittle-hard materials, in which the surface of a workpiece made of brittle-hard material is irradiated with a laser beam, wherein the wavelength of the laser beam is chosen such that the light is absorbed at the surface of the workpiece, so that the workpiece is heated at the surface and a temperature gradient is created in the direction from the surface to the interior of the workpiece, wherein the laser beam is guided over the surface of the workpiece, and wherein a further temperature gradient is formed along the surface between an irradiated region and an adjacent non-irradiated region, wherein the two temperature gradients interact in such a way that, due to the thermomechanical stresses caused by the temperature gradients, the workpiece separates below the surface and a portion of the workpiece is severed, in particular in the form of a chip. The method thus usually represents, similarly to metal machining, a chip-removing processing method and in reference thereto, is also referred to as a machining method. The way in which the chip is separated here is completely different from the processing of ductile metals by using mechanical tools that cut into the metal. The rapid, shock-like surface heating produces near-surface stresses that lead to the splitting off of a chip or, more generally, a portion of the workpiece. The method can therefore also be regarded as thermal shock machining.

The method is an astoundingly simple way for processing brittle-hard materials of this kind. A brittle-hard material is understood to mean, in this case, a hard material that, in contrast to metals, is not ductile. In accordance herewith, a brittle-hard material cannot be permanently deformed, but rather breaks. Typically, the breaking load is not clearly defined, either, but rather results from a probability distribution. These very properties make a chip-removing processing difficult to impossible, because the breakage of the workpiece comes about very rapidly. These difficulties are circumvented by the invention.

In fact, methods are known in which thermomechanical stress is produced by a laser and a workpiece is separated, for example, a method according to US 2019/0300417 A1. In such methods, of course, it is necessary that preliminary damage, for example, in the form of filaments, is present along the running line of the laser or of the laser beam. This preliminary damage is thus necessary for the method described in US 2019/0300417. The method described therein thus takes place in two steps. With the method in accordance with the present application, in contrast, it is provided that it is based purely on the thermal effect of a laser beam and of the described formation of temperature gradients as well as their specific interaction. In particular, the method can take place without an additional first step such as the introduction of preliminary damage. Beyond this, US 2019/0300417 A1 also describes a separating process, not a chip post-processing of a workpiece.

Coming into consideration as especially preferred brittle-hard materials for the workpiece are glass or glass ceramics. The method is even suitable for the machining of glasses and glass ceramics that are especially difficult to process. Thus, in accordance with one embodiment, it is provided that the material of the workpiece that is processed by the method is a glass ceramic with a thermal expansion coefficient $\alpha_{20\text{-}600}$ of at most $2 \cdot 10^{-6}$ K$^{-1}$. In this case, it is astounding that, in such a low-expansion material, the heating is able at all to build up an adequately large thermomechanical stress. In the same way, it is also possible to process low-expansion glasses, such as, for instance, so-called ULE glasses (ULE="ultra low expansion"), or titanium silicate glasses.

In accordance with a further embodiment, the material of the workpiece is a thermally prestressed glass. Glasses of this kind are especially difficult to process mechanically and, in general, are even impossible to mechanically process after the prestressing. In contrast, the method can be used to remove chips on thermally prestressed glasses as well, without cracking the glass.

An especially preferred application of the method is the processing of the edges of plate-shaped workpieces. In accordance therewith, it is provided in one embodiment that the workpiece has an edge, wherein the laser beam is guided along the edge in such a way that a chamfer is formed at the edge by detachment of the portion.

There also exists the possibility of processing surface areas by removing chips. To this end, in an alternative or additional embodiment of the method, it is provided that the beam of light is guided over the surface, that is, for example, over a lateral face of the workpiece, and, in this way, a depression is created in the surface by detachment of a portion.

The invention will be explained below in more detail and on the basis of the figures and exemplary embodiments.

DETAILED DESCRIPTION

Figure 1:
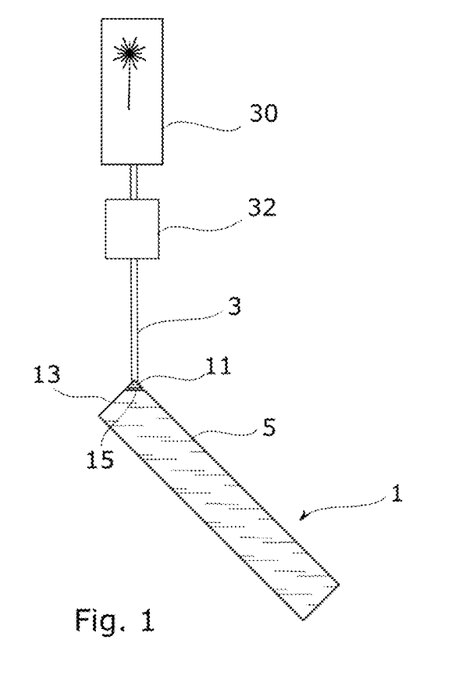
FIG. 1 shows an arrangement for chamfering the edge of a glass plate.

Depicted in FIG. 1 is an arrangement for the separative processing of brittle-hard materials, in particular of workpieces 1 made of glass or glass ceramics. In particular, the arrangement can be used to process an edge 13 of the workpiece 1 in order to form a chamfer at the edge 13. For processing, the surface of the workpiece 1 is irradiated with a laser beam 3, with the wavelength of the laser beam 3 being chosen such that the light is absorbed at the surface 5 of the workpiece 1. In this way, the workpiece 1 is heated at the surface 5 and a temperature gradient is created in the direction from the surface 5 to the interior of the workpiece 1. In order to create a strong temperature gradient at the surface, it is favorable when the light is also absorbed directly at the surface of the workpiece. In general, without any limitation to the illustrated exemplary embodiments, it is preferred for this purpose when the beam of light has a wavelength of at least 4.5 µm.

In order to create an adequate local heating power, a $CO_2$ laser or a CO laser is most preferably used as the laser 30. A $CO_2$ laser can supply high laser powers and can be operated at a laser wavelength that leads to a nearly complete, surface absorption of the laser beam in the material of the workpiece 1. In accordance with one embodiment, the $CO_2$ laser is operated with a wavelength of 10.6 µm. In accordance with another embodiment, a CO laser, that is, a carbon monoxide laser, is used. It can be operated, for example, with a wavelength of 5.5 µm. The shorter wavelength leads to a greater depth of penetration of the light and, accordingly, to a deeper heating of the workpiece 1.

The laser beam 3 is guided over the surface 5 of the workpiece 1 for separative processing. In the process, another temperature gradient is brought about along the surface 5 between an irradiated region 7 and an adjacent non-irradiated region 9 and migrates together with the point of impingement of the light beam 3. The two temperature gradients thereby act together in such a way that, due to the thermomechanical stresses caused by the temperature gradients, the workpiece separates below the surface 5 and a portion 11 of the workpiece 1 is severed, in particular in the form of a chip. In the case of edge processing, such as is illustrated in FIG. 1, the beam of light 3 is guided along the edge 13, so that the detachment of the portion 11 results in the formation of a chamfer 15 at the edge 13. In order to sever the chip-shaped portion 11, the beam of light 3 is irradiated at an inclination onto the edge 13, so that it impinges on the corner between the edge 13 and the lateral face 6 of the plate-shaped workpiece 1 shown here.

In order to guide the beam of light 3 along the edge 13, a scanner 32 is provided; for example, the scanner 32 can be designed as a galvanometer scanner. In particular, the scanner 32 can also comprise an F-θ lens; that is, it can be an F-θ scanner. It is obvious to the person skilled in the art that what is crucial for the method, however, is the relative movement between the beam of light 3 and the workpiece 1. Accordingly, it is equally possible for the workpiece 1 to be moved past the beam of light 3.

Figure 2:
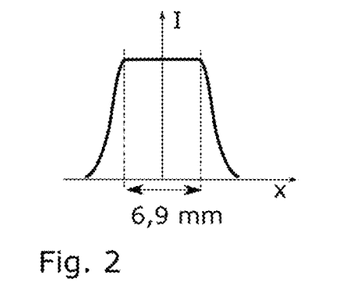
FIG. 2 shows an intensity profile of a laser beam.

FIG. 2 shows a beam profile of a laser beam 3 (see FIG. 1), such as is suitable for separative processing, in particular also for chamfering an edge of a workpiece. The laser beam has essentially a so-called top-hat profile with a beam diameter of about 7 mm. In general, beams of light with a beam diameter in the range of 1, preferably 2, to 20 millimeters, preferably in the range of 1 to 15 millimeters, or particularly preferred from 5 to 15 millimeters, are especially suitable.

Figure 3:
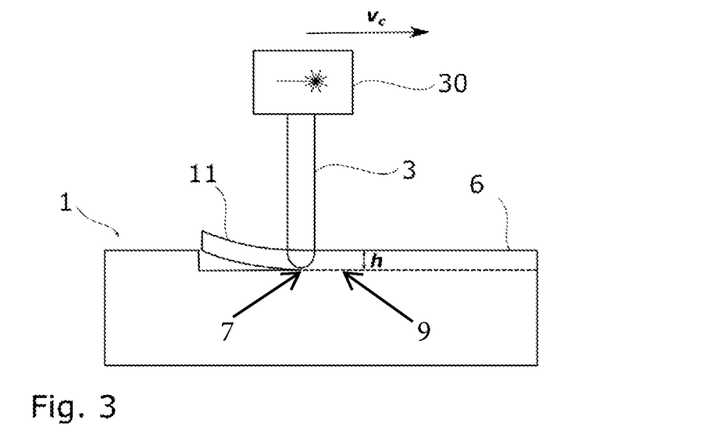
FIG. 3 shows an arrangement for introducing depressions.

The processing of edges was described on the basis of the example of FIG. 1. However, it is equally possible to guide the beam of light 3 over the surface of the workpiece 1 and to create a depression in the surface by detachment of the portion 11. In the case of a single processing, the depth of the depression corresponds to the cutting depth. To this end, FIG. 3 shows an arrangement by means of which the lateral face 6 of a workpiece 1 is processed by guiding the beam of light 3 of a laser 30 at a speed $v_c$ over the workpiece 1. Owing to the thermomechanical stresses exerted due to the local heating, a chip-shaped portion 11 with a chip thickness h is carved out of the lateral face 6. The chip thickness h is thereby also dependent on the speed $v_c$ and on the power and depth of penetration of the beam of light 3. In this case, in general and without limitation to the special embodiment according to FIG. 3, it is provided that the laser beam 3 is moved over the workpiece 1 at a speed in the range of 5 mm/s to 500 mm/s, preferably to 150 mm/s, particularly preferred to 50 mm/s, in the direction of propagation of the chip separation. In this way, a particularly efficient and rapid processing of the workpiece 1 is possible.

Figure 4:
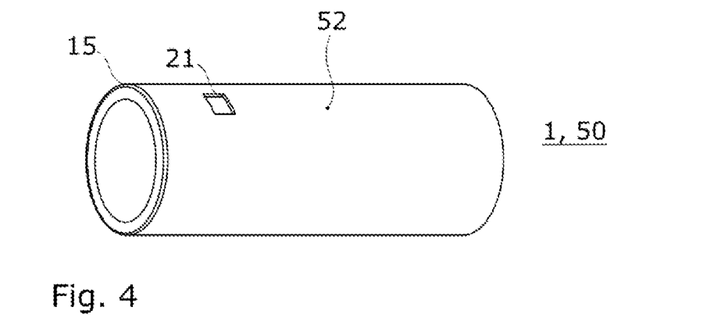
FIG. 4 shows a processed workpiece in the form of a tube.

In contrast to what is shown in FIG. 3, it is possible without anything further to use the method to process even curved or uneven surfaces of workpieces 1. To this end, FIG. 4 shows, as an example, a workpiece 1 in the form of a tube 50 that has been processed using the method. Introduced in the outer surrounding surface 52 of the tube 50 by way of the thermal-shock machining method is a depression 21. It is also possible, as illustrated, to chamfer the front ends of the tube 50. In the example shown, the chamfer 15 is introduced only at the especially sensitive outer surrounding surface 52 of the tube 50. Obviously, however, it is possible in the same way also to introduce a chamfer 15 at the front end toward the inner side of the tube 50.

Presented in the following table are the method parameters for an exemplary embodiment in which depressions have been introduced in a tube made of borosilicate glass by severing of material using the method described here:

| | |
|---|---|
| Laser medium: | CO, carbon monoxide |
| Laser power | P = 110.5 W |
| Scanning speed | 35 mm/s |
| Beam diameter | approximately 6 mm |
| Working distance of the workpiece from the lens of the F-θ scanner | approximately 200 mm |
| Tube geometry: | diameter 95 mm, wall thickness 2.5 mm |

FIG. 4 shows a further example of application of the invention. Processed in this example was a workpiece 1 that is used as a control panel 51. By way of example, square depressions 21 and an annular depression 22 were introduced. The depressions 21, 22 can thereby serve as haptic control aids in order to facilitate the tactile location of the switch elements of the control panel 51. In this case, such a control panel 51 can be utilized for household appliances, in particular for kitchen appliances, in order to mark the positions of touch switches, for instance. It is also possible to provide such control panels 51 in vehicles as a component of dashboards, for example.

Because it is possible to use surface heating to achieve locally very high rates of heating, the thermal-shock machining method in accordance with this disclosure can also be applied to brittle-hard materials, which can otherwise be processed only with difficulty. Thus, in general, without any limitation to the examples illustrated in the figures, it is provided in one embodiment that the workpiece is a glass ceramic with a thermal expansion coefficient $\alpha_{20-600}$ of at most $2 \cdot 10^{-6}$ K$^{-1}$. Surprisingly, even in the case of such a material, it is possible to create adequately large thermomechanical stresses. In accordance with yet a further embodiment, the workpiece is a thermally prestressed glass. Workpieces 1 made of this material also usually are processed with difficulty or not at all, because the compressive stresses in the glass lead to a breakage of the workpiece 1 when there is damage to the surface. By use of the method described here, however, edge processing, such as, for instance, the introduction of a chamfer 15, is very easily possible.

Figure 6:
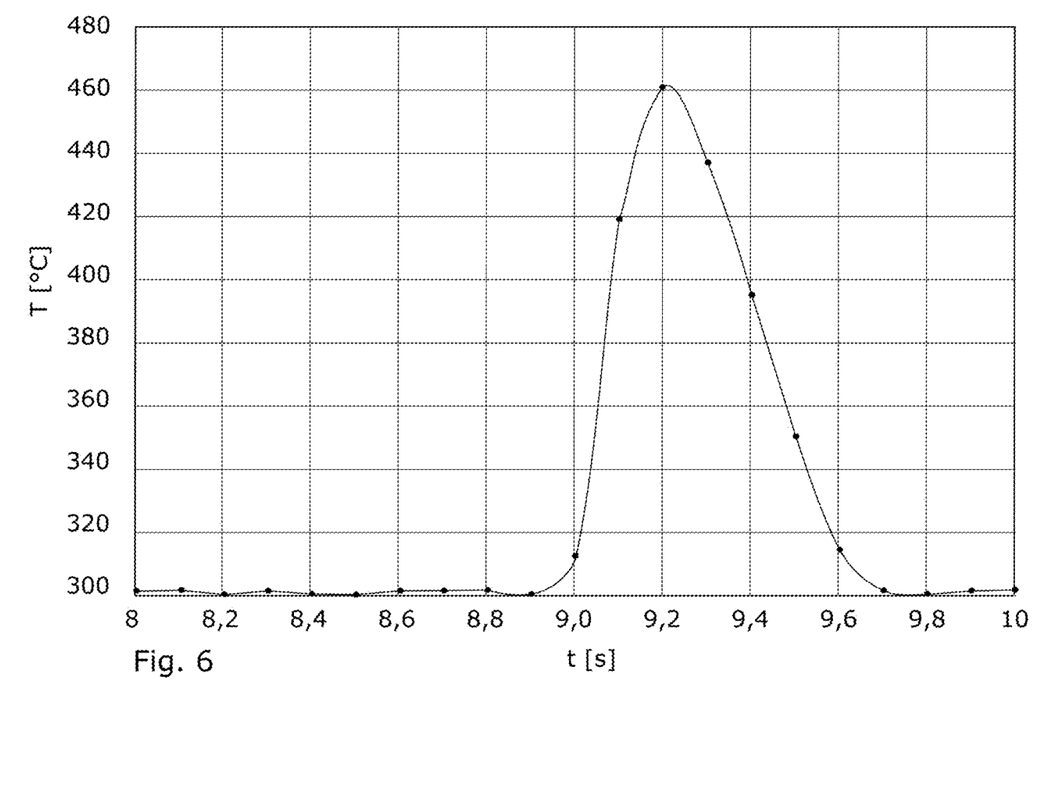
FIG. 6 shows a diagram of the curve of temperature versus time at a position on the workpiece that has been scanned by the beam of light.

In accordance with a preferred embodiment of the method, it is provided in general that, regardless of the material of the workpiece 1, the heating of the brittle-hard material and the following cooling at a position of the surface that has been scanned by the beam of light to a temperature of at most 20° above the temperature prior to the heating occurs within at most two seconds, preferably within at most one second. The rapid change in temperature, which also makes possible the processing of the aforementioned materials, is made especially clear on the basis of the example of FIG. 6. FIG. 6 shows the curve of temperature versus time at a measuring position on the edge of a workpiece. In this case, during the period of measurement, the beam of light 3 for the creation of a chamfer 15 passes beyond the measuring position. The measuring position here represents the measuring site of a pyrometer, with which the temperature was recorded. As can be seen, even 0.6 second after the start of the temperature rise, the initial temperature has once again almost been reached. The rise in temperature from the starting temperature to the maximum temperature is about 160° C. in this example. The rise in temperature here takes place within a time interval of only about 0.2 second. This corresponds to an average rate of heating of about 800° C. per second. The measuring site of the pyrometer was located, however, next to the path scanned by the laser, because otherwise the laser beam reflected from the glass would have influenced the measurement.

Figure 7:
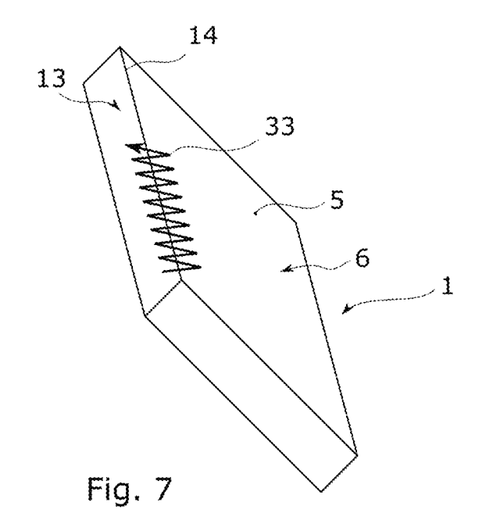
FIG. 7 shows an example of a movement of the laser beam over the workpiece.

It is especially advantageous to distribute the radiant flux on the workpiece 1. This is of advantage in order to prevent the creation of a markedly convex surface, which then corresponds to a fillet, during the production of a chamfer 15, for instance. Such a surface, in comparison to a flat or convex surface, would have sharper corners and correspondingly more sensitive edge lines. In accordance with one embodiment, it is therefore provided that the laser beam 3 is moved over the surface 5 in a movement pattern having an oscillating movement component. This is also favorable in the case when the laser beam already has a broader intensity profile, such as is shown, for instance, in the example of FIG. 2. Especially preferred, the laser beam in this case is moved continuously in a first direction over the workpiece 1, while the laser beam 3 makes an oscillating movement in a direction perpendicular thereto. An example of such a movement is shown in FIG. 7. In this example, similarly to the example of FIG. 1, the edge 13 of a plate-shaped workpiece 1 is processed in order to introduce a chamfer for improvement of the edge stability. The laser beam 3 here is moved continuously along the edge line 14 at the transition of the edge 13 to the lateral face 6. At the same time, the laser beam 3 oscillates perpendicular to the edge line 14 and hence also perpendicular to the first movement component along the edge line 14.

In order to achieve a uniform input of energy in the strips on the surface 5 of the workpiece scanned by the oscillating movement of the laser beam, it is of advantage to have a speed of the oscillating movement component that remains constant during a swiveling of the beam. Such a movement results, in an overlapping manner, in a zigzag path or a sawtooth-shaped path of the laser beam 3 on the workpiece. An example of a path 33 that the laser beam 3 describes is drawn in FIG. 7. In this example, the swiveling movements are of various rapidity, so that the laser beam 3 follows a sawtooth-shaped path 33.

Figure 8:
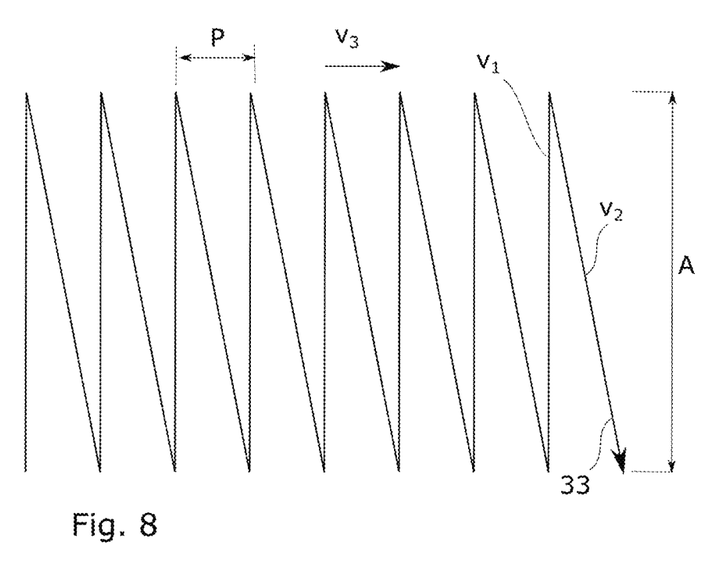
FIG. 8 shows an exemplary embodiment of a path of movement of the laser beam on the workpiece.

FIG. 8 shows an exemplary embodiment of such a path 33.

In general, without any limitation to the illustrated example, it is provided in a further development of the embodiment with oscillating movement of the laser beam 3 that the two opposite directions of the oscillating movement component of the movement of the laser beam 3 are traversed at different speeds. In the example shown in FIG. 8, the speed $v_1$ of the movement in the one direction is appreciably higher than the speed $v_2$ in the opposite direction. At the same time, the laser beam 3 moves at a speed $v_3$ over the workpiece in a direction that is perpendicular to the oscillating movement. As illustrated, this results in a sawtooth-shaped path 33 of the laser beam 3 with an amplitude A and a period P of the oscillation. Also, as described, the speeds $v_1$ and $v_2$ are uniform. If this is not the case, then the embodiment with the different speeds in opposite directions relates to the respective average speeds. The embodiment with differently rapid movements of the oscillation is especially advantageous, because the segments with slower movement—in this case, with speed $v_2$—have the same distances from each other and, for a constant laser power, contribute an overall higher energy input than do the segments with higher speed $v_2$. This leads overall to a very uniform energy density over the surface scanned by the laser beam 3. In this case, the amplitude of the oscillation need not be greater or at least not appreciably greater than the beam diameter of the laser beam. Thus, in accordance with yet a further development of this embodiment, it is provided that the amplitude of the oscillation is at most 1.5 times the beam diameter of the laser beam 3.

In accordance with another embodiment, it is provided that the detachment position and the irradiation position are shifted in time or in location, so that the detachment of the portion 11 first occurs at a specific detachment position, after the laser beam 3 has crossed over this position. The detachment of the portion 11 thus occurs shifted in time, so that at the time point of the detachment, the laser beam 3 is already irradiating a place on the workpiece 1 that is different than the one at which the detachment is occurring.

Figure 9:
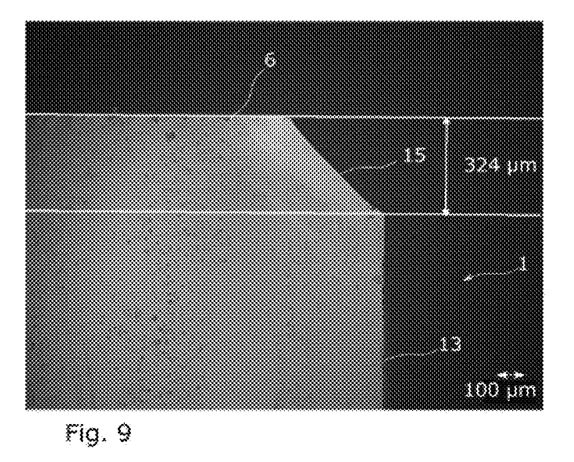
FIG. 9 shows a microscopic image of the edge of a workpiece with a chamfer.

FIG. 9 shows a microscopic image of a workpiece 1 with a processed edge 13. As described on the basis of FIG. 1, the method described here was used to introduce a chamfer 15 in the edge 13 of the workpiece 1. As viewed in the direction onto the edge face, the chamfer 15 has a height of about 320 μm. It can be seen from the straight outline line that the chamfer 15 forms an essentially flat surface. In order to produce such a chamfer 15, as described on the basis of FIG. 7, FIG. 8, the laser beam 3 was moved along the edge 13, and, at the same time, made an oscillating movement perpendicular to the movement along the edge.

The method described here is suitable, in particular in connection with a method for separating a workpiece made of brittle-hard material with the introduction of a plurality of adjacently extending filamentous damage sites along a predefined separating line by means of an ultrashort pulse laser. This method makes possible a fast and cost-effective cutting of workpieces in any chosen outline shape. However, the edges that are produced in this way are quite sensitive. The method also offers here, in turn, in particular, carrying out the production of chamfers with the aid of lasers, as provided according to this disclosure In accordance therewith, it is provided in one embodiment that filamentous damage sites are created adjacent to each other along a separating line in the volume of an element made of brittle-hard material, the damage sites are introduced by laser pulses of an ultrashort pulse laser, for which the material of the element is transparent, the points of impingement of the laser pulses on the element are introduced in succession next to one another along a line, that is, along a predefined separating line, after the introduction of the filamentous damage sites, the element is separated at the separating line at the filamentous damage sites lying next to one another, so that a workpiece 1 with an edge 13 along the separating line is produced, and at the edge 13, a chamfer 15 is then introduced at least on one side by the method described here. Typically, the filamentous damage sites in the volume of the workpiece are brought about by a plasma that is created by the intensive laser pulse.

Figures 10, 12:
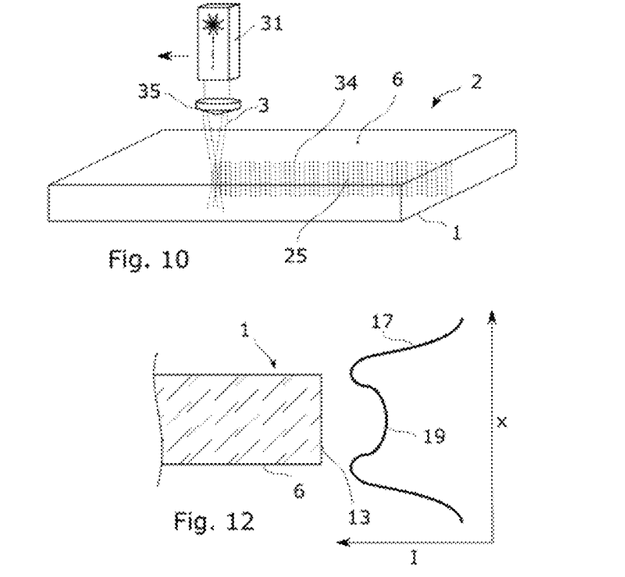
FIG. 10 depicts an arrangement for introducing a separating line for carving out a workpiece.
FIG. 12 shows the irradiation of a workpiece by a laser beam having a special beam profile.

FIG. 10 shows an arrangement for the introduction of the filamentous damage sites 25 in the element 2. The ultrashort pulse laser 31 emits a pulsed laser beam 3, which is focused by a lens 35 to form an extended and, in particular, linear focus in the element 2. The intensive irradiation in the focus results in the creation of a plasma in the material of the element 2. This phenomenon is also referred to as "optical breakdown." The plasma leaves behind a likewise linear or filamentous damage site 25 in the material, which extends in the direction from one of the lateral faces 6 to the opposite-lying lateral face 6. The laser 31 and the element 2 are moved relative to each other during the emission of the laser pulse, so that a plurality of filamentous damage sites are introduced next to one another in the element 2 along a separating line 34. It is then possible to separate the element 2 at this separating line 34, so that a workpiece 1 of the desired dimensions is obtained. The edge created at the separating line 34 can then be chamfered using the method described here in order to make the edge mechanically more robust against damage.

Figure 11:
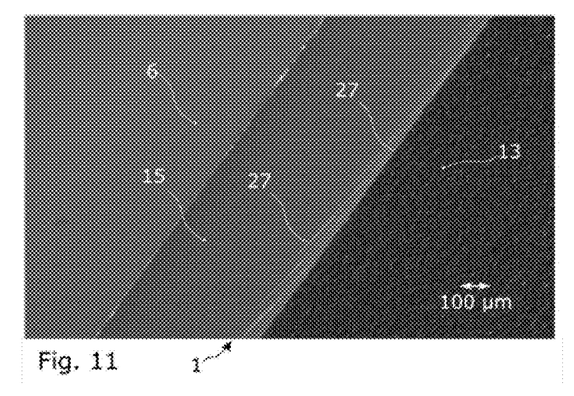
FIG. 11 shows a microscopic image of the edge of a workpiece with a chamfer.

FIG. 11 shows a microscopic image of the workpiece 1 in perspective (compare FIG. 10) as viewed in the direction onto the chamfer 15. As can be seen, the edge 13 of the workpiece has a greater roughness than does the lateral face 6. The edge 13 was created by the introduction of filamentous damage sites next to one another along a predefined separating line by means of an ultrashort pulse laser and severing of the workpiece at the separating line. The workpiece that can be produced using the method has a number of characteristic features. Readily seen are Wallner lines 27 formed by the separation operation. Wallner lines 27 are formed by an overlap of the separating front, which propagates when the chip is detached, with elastic waves in the brittle-hard material, these waves being induced when the material tears apart. In this case, the elastic waves have a propagation rate that is higher than the rate of propagation of the separating front or the crack front, which is determined by the advance of the laser beam 3, between the detached portion 11 and the workpiece 15.

As can be seen on the basis of the image, the Wallner lines 27 have a very shallow angle to the edge line 14 between the chamfer 15 and the edge 13. The angle is less than 20°, preferably less than 10°. Without any limitation to the special example shown in FIG. 11, therefore, in one embodiment of the invention, a plate-shaped workpiece 1 made of brittle-hard material is provided, which has two opposite-lying lateral faces 6 and an edge 13 that forms the edge of the workpiece 1, wherein the surface of the edge 13 has a greater roughness than does the surface of the lateral faces 6, wherein the transition from the edge 13 to at least one of the lateral faces 6 is formed by a chamfer 15, and wherein Wallner lines 27 in the surface of the chamfer 15 originating from the edge line 14 extend between the chamfer 15 and the edge 13 and enclose an angle with respect to the edge line 14 that is less than 20°. As can be seen on the basis of FIG. 9, moreover, the chamfer 15 can, as stated, be slightly concave in shape, whereby, in particular, the profile of the chamfer 15 has a concave course, so that the concave shape can be readily seen in the cross-sectional view, as in FIG. 9. Accordingly, the curvature vector extends along the lengthwise direction of the edge 13. The maximum deviation from a straight-line profile, however, is preferably less than 10 μm, as in the example illustrated. In accordance with one embodiment, in general, it can be provided that the laser beam 3 can strike the edge at an angle in the range of 0° to 90°. This serves for aligning the chamfer. In addition, it can generally be provided that the laser beam 3 strikes the edge with symmetrical intensity distribution, shifted to the center of the narrow side.

In the method, as explained on the basis of FIG. 7 and FIG. 8 by way of example, the power of the laser beam 3 is distributed through an oscillating movement. In accordance with an alternative or additional embodiment of the invention, it is also possible that the workpiece 1 is irradiated with a laser beam 3 that has a beam profile with a light intensity that varies crosswise to the beam direction and, in particular, has a beam profile with a local minimum for the light intensity, with detachment of a portion 11 having a local thickness corresponding to the local light intensity of the beam of light 3 or to the power density.

To this end, FIG. 12 shows an example with which a specially shaped edge 13 of a workpiece 1 is to be produced.

The laser beam is preferably irradiated perpendicularly onto the edge 13 of the workpiece 1 and has an expanded beam profile 17 with a local minimum 19. An expanded or distributed beam can generally be advantageous in order to process the edge 13 over its entire width. Without any limitation to the special illustrated example, therefore, it is provided in a further development of the invention that the edge 13 of the workpiece 1 is heated by the laser beam 3 over its entire width, corresponding to the thickness of the workpiece 1. This can result by way of a corresponding oscillating movement of the laser beam 3 or by way of a correspondingly expanded beam profile. Correspondingly, it is then possible for the portion 11 to be detached from the workpiece 1 in the form of a strip having the width of the edge 13.

Figure 13:
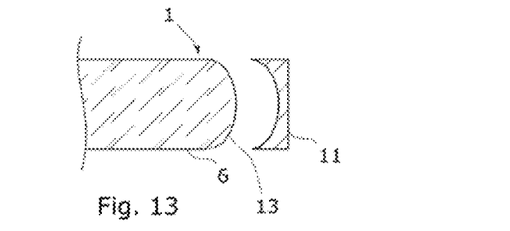
FIG. 13 shows the workpiece that is irradiated with the laser beam of FIG. 12.

In general, the local thickness of the detached portion 11 corresponds to the local beam intensity. The minimum 19 in the beam profile 17 correspondingly also brings about a reduced thickness of the detached portion 11. To this end, FIG. 13 shows the edge 13 that has been processed with the expanded laser beam as well as the corresponding detached portion 11. By use of the beam profile with the local minimum, it is possible, as illustrated, to produce a so-called C-edge. This edge has a rounded profile and is especially insensitive relative to damage. In general, without any limitation to the special example, it is provided for this purpose in a further development of the invention that the edge 13 of the workpiece 1 is irradiated with a laser beam with such an intensity distribution on the surface of the workpiece 1 that, owing to the detachment of the portion 11, an edge 13 having a rounded profile is obtained. In this case, the spatial distribution can be achieved by way of a corresponding beam profile as well as by way of a movement, in particular an oscillating movement of the beam.

Figure 5:
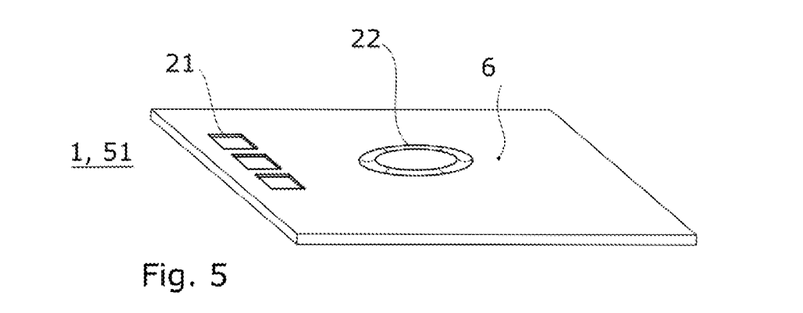
FIG. 5 shows a control panel processed by the method.

It is obvious to the person skilled in the art that the invention is not limited to the described exemplary embodiments, but rather can be varied in diverse ways within the scope of the subject of the following claims. In particular, it is also possible to combine exemplary embodiments. Thus, an edge processing, such as shown in FIG. 1 or FIG. 12, can be combined with the introduction of depressions, such is illustrated in FIG. 4 or FIG. 5. Depressions can also be introduced not only in a lateral face, but also, depending on the application, in the edge of a plate-shaped workpiece 1. Furthermore, the depressions can also be introduced by use of a laser beam 3 with an oscillating movement component, such as illustrated in FIG. 7 and FIG. 8.

LIST OF REFERENCE NUMBERS 1 workpiece
2 element
3 laser beam
5 surface of 1
6 lateral face
7 irradiated region
9 non-irradiated region
11 detached portion
13 edge
14 edge line
15 chamfer
17 beam profile
19 minimum of 17
21 depression
22 annular depression
25 filamentous damage site
27 Wallner line
30 laser
31 ultrashort pulse laser
32 scanner
33 path of 3 on 1
34 separating line
35 lens
50 tube
51 control panel

What is claimed is:

1. A method for the separative processing of brittle-hard materials, comprising:
   irradiating a surface of the workpiece with a laser beam having a laser beam diameter of between 1 mm and 15 mm and a wavelength sufficient so that light from the laser beam is absorbed at the surface to heat the surface with a first temperature gradient in a direction from the surface to an interior;
   guiding the laser beam over the surface along an irradiated region so that a second temperature gradient forms along the surface between the irradiated region and a non-irradiated region that is adjacent to the irradiated region; and
   interacting the first and second temperature gradients so that thermomechanical stresses caused by the first and second temperature gradients separates the workpiece below the surface by severing a chip from the surface of the workpiece, wherein the chip has a thickness that is less than a total thickness of the workpiece.

2. The method of claim 1, wherein the brittle-hard materials comprise glass or glass ceramics.

3. The method of claim 1, wherein the brittle-hard materials have a thermal expansion coefficient $\alpha_{20\text{-}600}$ of at most $2 \cdot 10^{-6}$ $K^{-1}$.

4. The method of claim 1, further comprising thermally prestressing the brittle-hard materials before the step of irradiating the surface.

5. The method of claim 1, wherein the step of guiding the laser beam over the surface comprises guiding the laser beam over an edge of the workpiece and wherein the step of interacting severs the chip from the workpiece to form a chamfer at the edge.

6. The method of claim 5, further comprising creating filamentous damage sites next to one another along a separating line in the workpiece and separating the workpiece along the separating line to define the edge of the workpiece.

7. The method of claim 1, wherein the laser beam has a property selected from a group consisting of a wavelength of at least 4.5 µm, a $CO_2$ laser beam, a CO laser beam, and any combinations thereof.

8. The method of claim 1, wherein the step of guiding the laser beam over the surface comprises moving the laser beam at a speed in a range of 5 mm/s to 500 mm/s.

9. The method of claim 1, wherein the step of guiding the laser beam over the surface comprises moving the laser beam in a pattern having an oscillating movement component.

10. The method of claim 1, wherein the step of guiding the laser beam over the surface comprises moving the laser beam continuously over the workpiece in a first direction, while the laser beam makes an oscillating movement in a direction perpendicular to the first direction.

11. The method of claim 1, wherein the step of guiding the laser beam over the surface comprises moving the laser beam at a constant speed in a first direction, while swiveling the laser beam with an oscillating movement component, the oscillating movement component having two opposite directions that are traversed at different speeds.

12. The method of claim 11, wherein the oscillating movement component has an amplitude that is at most 1.5 times the laser beam diameter.

13. The method of claim 1, wherein the step of irradiating the surface comprises irradiating with a laser beam profile that varies in light intensity crosswise to a direction of the laser beam.

14. The method of claim 1, wherein the first temperature gradient is formed over an entire width of the workpiece so that the chip is a strip.

15. The method of claim 1, wherein the step of irradiating the surface comprises irradiating with a laser beam intensity distribution sufficient so that an edge with rounded profile is obtained.

16. The method of claim 1, further comprising cooling the surface up to a temperature of at most 20° above a temperature of the first temperature gradient within at most two seconds.

17. The method of claim 1, wherein the severing of the chip from the workpiece leaves a depression in the surface.

18. The method of claim 1, further comprising heating the workpiece to a temperature of at least 100° C. before the step of irradiating the workpiece.

19. The method of claim 1, wherein the laser beam strikes the surface at an angle in the range of 0° to 90°.

20. The method of claim 1, wherein the laser beam strikes the surface with a symmetrical intensity distribution, shifted to a center of a narrow side of the workpiece.

21. A method for the separative processing of brittle-hard materials, comprising:
    providing a workpiece made of the brittle-hard materials that lacks any filamentary damages in a volume of the workpiece;
    irradiating a surface of the workpiece with a focused laser beam having a top-hat profile and a wavelength sufficient so that light from the laser beam is absorbed at the surface to heat the surface with a first temperature gradient in a direction from the surface to an interior;
    guiding the laser beam over the surface along an irradiated region so that a second temperature gradient forms along the surface between the irradiated region and a non-irradiated region that is adjacent to the irradiated region; and
    interacting the first and second temperature gradients so that thermomechanical stresses caused by the first and second temperature gradients separates the workpiece below the surface by severing a chip from a lateral face of the workpiece.

22. A method for the separative processing of brittle-hard materials, comprising:
    creating filamentous damage sites next to one another along a separating line in a workpiece made of the brittle-hard materials;
    separating the workpiece along the separating line to define an edge at a lateral face of the workpiece;
    irradiating a surface of the workpiece with a laser beam having a laser beam diameter of between 1 mm and 15 mm and a wavelength sufficient so that light from the laser beam is absorbed at the surface to heat the surface with a first temperature gradient in a direction from the surface to an interior;
    guiding the laser beam over the surface along the edge so that a second temperature gradient forms in the workpiece offset from the edge;
    interacting the first and second temperature gradients so that thermomechanical stresses caused by the first and second temperature gradients severs a chip from the edge; and
    chamfering the edge by repeating the irradiating, guiding, and interactive steps to remove chips.

* * * * *